(12) United States Patent
Qiu et al.

(10) Patent No.: US 9,047,623 B2
(45) Date of Patent: *Jun. 2, 2015

(54) DETERMINATION OF RECOMMENDATION DATA

(71) Applicant: Alibaba Group Holding Limited, George Town (KY)

(72) Inventors: Guang Qiu, Hangzhou (CN); YiZhe Liu, Hangzhou (CN); Weidong Yin, Hangzhou (CN); Song Yang, Hangzhou (CN); Ning Guo, Hangzhou (CN); Liang Zhang, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/146,571

(22) Filed: Jan. 2, 2014

(65) Prior Publication Data

US 2014/0188609 A1    Jul. 3, 2014

Related U.S. Application Data

(63) Continuation of application No. 13/452,371, filed on Apr. 20, 2012, now Pat. No. 8,655,890.

(30) Foreign Application Priority Data

Apr. 25, 2011    (CN) .......................... 2011 1 0104248

(51) Int. Cl.
  *G06F 17/30* (2006.01)
  *G06Q 30/02* (2012.01)
(52) U.S. Cl.
  CPC ............ *G06Q 30/0256* (2013.01); *G06Q 30/02* (2013.01); *G06F 17/30752* (2013.01); *G06F 17/3082* (2013.01); *G06F 17/30867* (2013.01)

(58) Field of Classification Search
  None
  See application file for complete search history.

(56) References Cited

U.S. PATENT DOCUMENTS 8,655,890 B2 * 2/2014 Qiu et al. ...................... 707/748
2007/0156887 A1   7/2007 Wright et al.

FOREIGN PATENT DOCUMENTS

CN    101354714    1/2009
CN    101446959    6/2009

(Continued)

OTHER PUBLICATIONS

Liu et al. "Personalized search recommendation based on gradual forgetting collaborative filtering strategy." Intelligent Information Technology Application, 2009. IITA 2009. Third International Symposium on. vol. 2. IEEE, 2009.

(Continued)

*Primary Examiner* — Wilson Lee
(74) *Attorney, Agent, or Firm* — Van Pelt, Yi & James LLP

(57) ABSTRACT

Determining recommendation data is disclosed, including: extracting a first set of keywords from a set of user action logs that occurred prior to a predetermined time point and determining a weight value for at least one of the first set of keywords; extracting a second set of keywords from a set of user action logs that occurred subsequent to the predetermined time point and determining a weight value for at least one of the second set of keywords; merging at least a portion of the first set of keywords and at least a portion of the second set of keywords to obtain a third set of keywords and determining a weight value for at least one of the third set of keywords; matching the third set of keywords to a database of data that can potentially be recommended to a user; and in the event that a piece of data is determined to match at least one keyword from the third set of keywords, determine that the piece of data is to be recommended to the user.

23 Claims, 7 Drawing Sheets

(56) References Cited

FOREIGN PATENT DOCUMENTS

| JP | 2000215204 | 8/2000 |
|---|---|---|
| JP | 2005316899 | 11/2005 |
| JP | 2005352754 | 12/2005 |
| JP | 2008117134 | 5/2008 |

OTHER PUBLICATIONS

Yu et al. "A timeline-based algorithm for personalized tag recommendation." Web Information Systems Engineering—WISE 2010 Workshops. Springer Berlin Heidelberg, 2011.

Tavakolian et al. "A novel web recommender system considering users' need evolution." Telecommunications (IST), 2010 5th International Symposium on. IEEE, 2010.

\* cited by examiner

DETERMINATION OF RECOMMENDATION DATA

This application is a continuation of co-pending U.S. patent application Ser. No. 13/452,371, entitled DETERMINATION OF RECOMMENDATION DATA filed Apr. 20, 2012 which is incorporated herein by reference for all purposes, which claims priority to People's Republic of China Patent Application No. 201110104248.9 entitled A RECOMMENDATION DATA PUSHING METHOD AND SYSTEM filed Apr. 25, 2011 which is incorporated herein by reference for all purposes.

FIELD OF THE INVENTION

The present application involves data processing technology. In particular, it involves a technique for determining recommendation data.

BACKGROUND OF THE INVENTION

At websites, sometimes recommendation data is presented to the user. Recommendation data can include online advertisements and/or product recommendations related to the web pages that the user has browsed or is currently browsing.

Take an example of recommendation data that comprises Internet advertising placement: in some traditional techniques of placing advertisements (ads) on a website, a certain predetermined ad is displayed at a fixed location on the website for a predetermined length of time. The ads displayed by this technique can be seen by all users who visit the website, which is to say that every user who visits the website can browse the same ads. Often, this type of ad placement technique does not consider individual differences among the users who visit the website and so the effectiveness of these ad placement techniques is relatively poor. In response, ad placement targeted for particular users emerged to better cater to individual website visitors.

In some conventional systems of targeted ad placement, an ad is selected for a user based on the content that the user is currently browsing and the ad is displayed at a predetermined location on the website. For example, in the course of the user's browsing of a web page, the web server hosting the website receives web page data requests sent by the client device on which the user is performing the browsing and obtains the requested web page data to be displayed as content at the website. The ads to be displayed at the website are then determined on this website content and the ad data is returned along with the requested website content to be displayed at the client device. However, one disadvantage in this technique of targeted ad placement is that due to the diversity of content that can be displayed at each website, the determined ad data based on the website content may not accurately match up with the user's interests.

Furthermore, in some conventional systems of target ad placement, determination of ad placement is determined in real-time in response to receiving a request by a user for website content. As a result, a real-time determination, which may involve the analysis of a large volume of data at the web server, may be needed to be performed frequently. However, frequent processing of data at the web server may be inefficient and also increase the response time to client requests for website content, especially when the website traffic is high.

BRIEF DESCRIPTION OF THE DRAWINGS

Various embodiments of the invention are disclosed in the following detailed description and the accompanying drawings.

DETAILED DESCRIPTION

Figure 1:
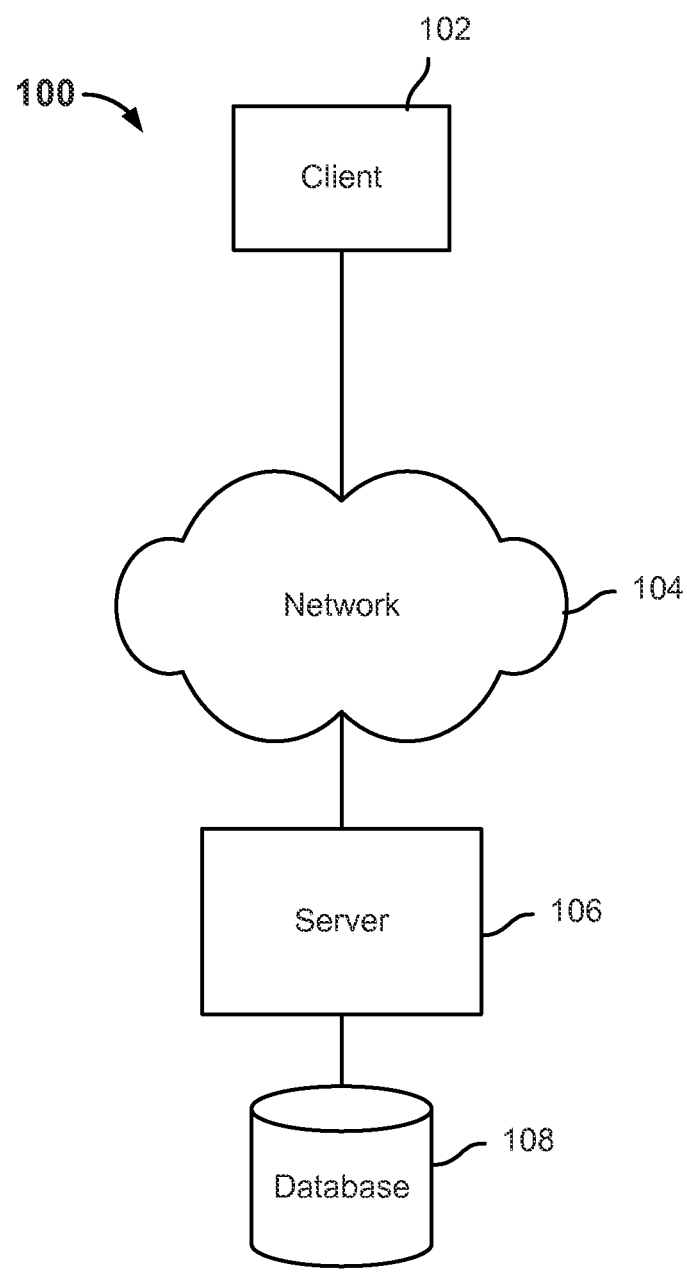
FIG. 1 is a diagram showing an embodiment of a system for determining recommendation data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Determining recommendation data is described herein. Because recommendation data generated in real-time in response to a user's request of data at a website may be inefficient and slow, recommendation data can be determined in advance and stored. Examples of recommendation data can include ads to be placed on the website currently visited by the user and/or products to be recommended to the user currently visiting the website. So, when the user later requests data at the website, at least some of the recommendation data determined in advance can be retrieved and pushed to the user at the website along with the requested content. Recommendation data is made to a user based on the user's historical action logs associated with one or more websites. For example, user action logs can include timestamps, records of the user's click, search, browsing and bookmarking operations on the website(s), and the keywords associated with the user operations at the website(s) during the user's visits/accesses to the website(s). Recommendation data to the user is determined based at least in part on keywords that are extracted from the user's historical user action logs. Because there could be a large volume of historical action logs stored for a user, it is inefficient to extract keywords from the entire large volume of user action logs. In various embodiments, a time point is predetermined that divides the action logs into two sets: one set that includes the user action logs that are recorded prior to the predetermined time point and the second set that includes the user action logs that are recorded subsequent to the predetermined time point. For example, the predetermined time point can be configured to be relevant to the time of a user's current visit to the website, such as the most recent three days. In that example, one set of user action logs can include those recorded for the user in the past three days while the other set of user action logs can include those recorded for the user since the user's first visit to the website up until the three days prior to the current day.

In various embodiments, separate keyword extraction and weighting computation are performed on the set of user action logs that occurred prior to the predetermined time point and the set of user action logs that occurred subsequent to the predetermined time point. In some embodiments, keywords extracted from user action logs that occurred closer to the current time (i.e., keywords extracted from user action logs in the set subsequent to the predetermined time point) are assigned higher weight values because they are assumed to better represent the most updated interests of the user while keywords extracted from user action logs that occurred farther from the current time are assigned lower weight values (i.e., keywords extracted from user action logs in the set prior to the predetermined time point) because they are assumed to represent older and possibly more outdated interests of the user. In various embodiments, the set of user action logs associated with timestamps prior to the predetermined time point is processed periodically using a larger periodic value, and the set of user action logs associated with timestamps subsequent to the predetermined time point is processed periodically using a smaller periodic value (i.e., the set of user action logs that occurred prior to the predetermined time point is processed less frequently than the user action logs that occurred subsequent to the predetermined time point). In some embodiments, the set of user actions that occurred subsequent to the predetermined time point may even be processed at the time that the web server determines that a user is accessing a web page and/or is requesting website content. In some embodiments, keywords extracted from the sets of user action logs that occurred prior to and subsequent to the predetermined time point are used to determine the recommendation data to be stored and to be sent to the user at a subsequent visit of the user to the website.

During a subsequent visit of the user to the website, it is no longer necessary to perform real-time determination of recommendation data based on the web page data requested by the user. Instead, since recommendation data that corresponds to the user has already been determined for the user in advance, the recommendation data can simply be retrieved from storage. Even if the web server processes the set of user action logs associated with timestamps subsequent to the predetermined time point at the time that the user visits the website, the volume of data that is processed is comparatively small relative to the volume of data associated with all the user action logs and therefore, the processing volume for determining recommendation data is greatly reduced.

FIG. 1 is a diagram showing an embodiment of a system for determining recommendation data. In the example, system 100 includes client 102, network 104, server 106, and database 108. Network 104 may include high-speed data and/or telecommunications networks.

Server 106 is configured to record user action logs associated with users that access a website hosted by server 106. Server 106 can store user action logs in database 108, for example. For example, user action logs can include timestamps, records of the user's click, search, browsing and bookmarking operations on the website(s), and the keywords associated with the user operations at the website(s) during the user's visits/accesses to the website(s). Client 102 can be a laptop computer, a desktop computer, a tablet, a mobile device, a smart phone, or any other computing device. In some embodiments, a web browser application is installed at client 102 and enables a user to access webpages associated with a website hosted by server 106. Server 106 may comprise a single or multiple devices.

Server 106 is configured to determine for a user a set of keywords that are used to represent the user's interests at the website based on the user's recorded user action logs retrieved from database 108. This set of keywords determined for the user can be used to match against a database of data that can potentially be recommended to the user (e.g., online ads that are to be presented to the user). In some embodiments, pieces of data determined to be recommended to that user are stored in database 108, such that when a user next visits the website hosted by server 106 using client 102, at least one such piece of data to recommend to the user is displayed for the user at client 102, in addition to other website content requested by the user. How this set of keywords that represent the user's interests is determined is described with greater detail below.

Figure 2:
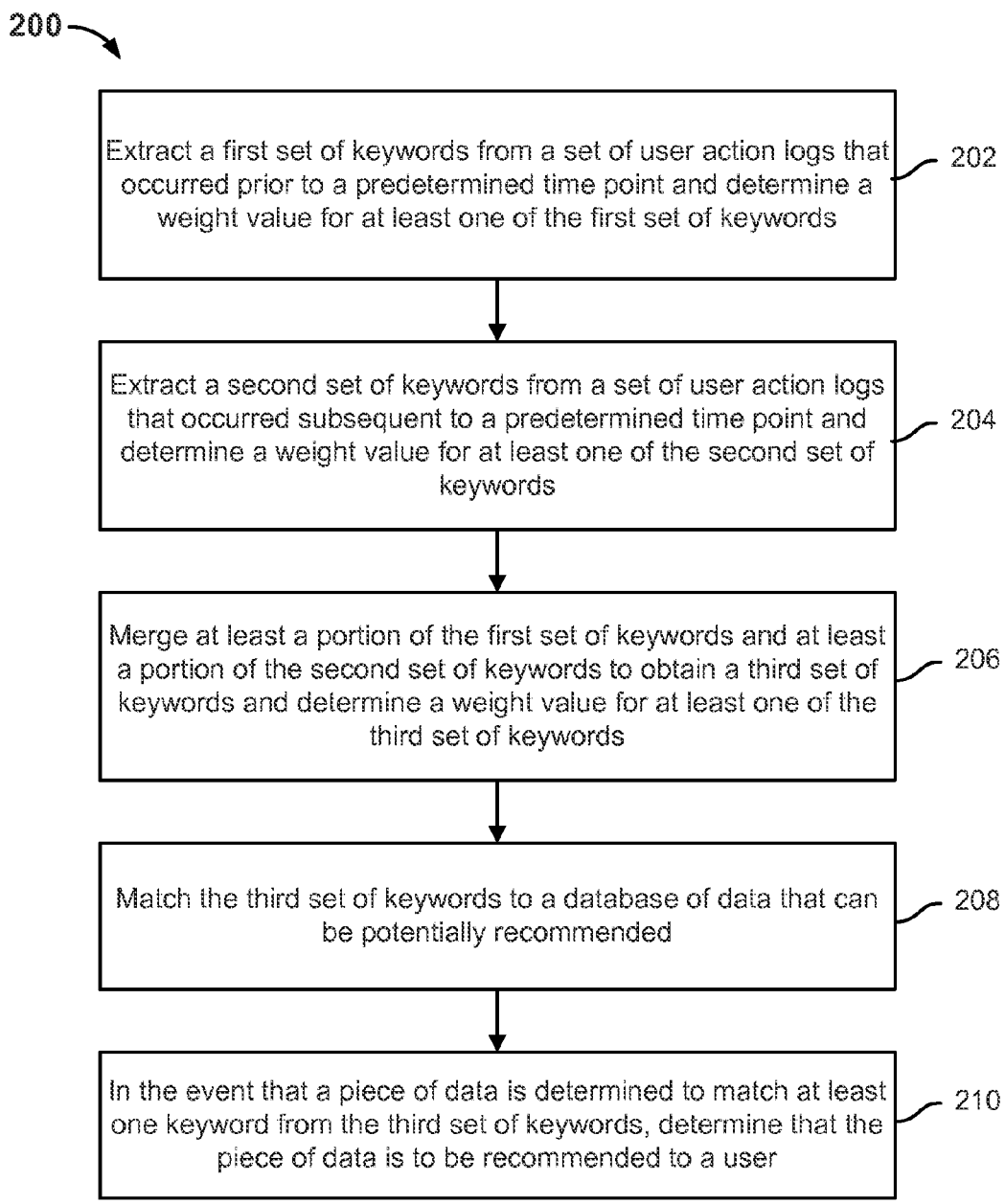
FIG. 2 is a flow diagram showing an embodiment of a process for determining recommendation data.

FIG. 2 is a flow diagram showing an embodiment of a process for determining recommendation data. In some embodiments, process 200 can be implemented at system 100.

Process 200 can be initiated in response to receiving a user's request for website content (e.g., the user visits a website and/or has selected a selectable element at the website). In some embodiments, prior to the start of process 200, a time point is determined. For example, the time point can be a period of time relative to a current time. An example of a time point can be three days ago from the current day.

In some embodiments, all the historical user action logs recorded for the particular user can be retrieved. For example, user action logs can include timestamps, records of the user's click, search, browsing and bookmarking operations on the website(s), and the keywords associated with the user operations at the website(s) during the user's visits/accesses to the website(s). In some embodiments, user identification information to be used to identify the relevant user action logs may be obtained after the user has logged onto the website using a registered account, or the user identification information may be determined by the web server based on the IP address or other information known about the user. For example, if the user is a registered user of the website, when the user has registered and logged on to the website through the user's account, the user can be identified by the user ID of the account, and retrieval of the user action logs can be based on the user ID, and if the user is an unregistered user or the user is not logged on through an account, then the user's action logs can be retrieved based on the user's cookies.

In some embodiments, the retrieved user action logs can be divided into two sets, one set that occurred prior to the predetermined time point and the other set that occurred subsequent to the predetermined time point.

At 202, a first set of keywords is extracted from a set of user action logs that occurred prior to a predetermined time point, and a weight value for at least one of the first set of keywords is determined. In some embodiments, a first set of keywords is extracted from the set of user action logs that occurred prior to the predetermined time point based at least in part on a predetermined extraction technique/manner.

At 204, a second set of keywords is extracted from a set of user action logs that occurred subsequent to a predetermined time point and a weight value for at least one of the second set of keywords is determined. In some embodiments, a second set of keywords is extracted from the set of user action logs that occurred subsequent to the predetermined time point based at least in part on a predetermined extraction technique/manner. In some embodiments, each keyword in the second set of keywords is assigned a higher weight value than the weight values assigned to the values of the first set of keywords because the second set of keywords is assumed to represent the user's more recent interests and therefore merit more importance, as indicated by the weight values of the second set of keywords.

In some embodiments, either 202 or 204 could be performed before the other or 202 and 204 could be performed during at least overlapping times.

In some embodiments, a first time period can be set such that 202 is performed at the end of each first time period. In some embodiments, a second time period can be set such that 204 is performed at the end of each second time period. By setting either or both of the first and second time periods, the first and second sets of extracted keywords can be cyclically refreshed (i.e., replaced with a new set) at the end of each time period to better reflect the keywords of more recently stored user action logs. In various embodiments, the first time period is set to be longer than the second time period such that the second set of keywords is more often refreshed than the first set of keywords. For example, the first time period can be one day and the second time period can be one hour or in response to the user accessing the website.

At 206, at least a portion of the first set of keywords and at least a portion of the second set of keywords are merged to obtain a third set of keywords and a weight value is determined for at least one of the third set of keywords. In some embodiments, merging the first and second set of keywords includes identifying duplicate keywords that are found in both the first set and second sets of keywords. For each such duplicate keyword, its weight value determined for the first set of keywords is combined (e.g., added) to its weight value determined for the second set of keywords. This combined weight value is then associated with the keyword once it is included in the third set of keywords. The third set includes only one instance of each duplicate keyword and the duplicate keyword's associated combined weight value and also the other, non-duplicate keywords from the first set and the second set and their respective weight values determined while in the first set or the second set of keywords.

In some embodiments, the third set of keywords determined for a user is considered to represent the user's interests. In some embodiments, the third set of keywords is stored for the user.

At 208, it is determined whether the third set of keywords matches a database of data that can be potentially recommended. In some embodiments, pieces of data to potentially recommend to the user are predetermined and stored in a database. For example, such pieces of data can include online ads and/or products (e.g., if the website comprised an e-commerce website).

At 210, in the event that a piece of data from the database is determined to match at least one keyword from the third set of keywords, the piece of data is determined to be recommended to a user. For example, a piece of data can be an online ad and may be associated with one or more bid words/keywords/metadata and if the bid words/keywords/metadata associated with the piece of data match a keyword of the third set of keywords, then the ad is displayed to the user when the user requests website content. In another example, known matching techniques such as BM25 or vector space models, may be used in matching the third set of keywords and the pieces of data.

In some embodiments, matched pieces of data are sent to be displayed for the user along with some website content requested by the user. In some embodiments, subsequent to the performance of process 200, at least one piece of data (e.g., a targeted online ad) determined to be recommended to the user can be presented to the user in response to a request for more website content by the user. For example, each time that a user selects a selectable element at a website that causes the website to refresh with at least some new content, one or more pieces of data that have been determined to be recommended to the user are sent to the client device along with the requested content.

Figure 3:
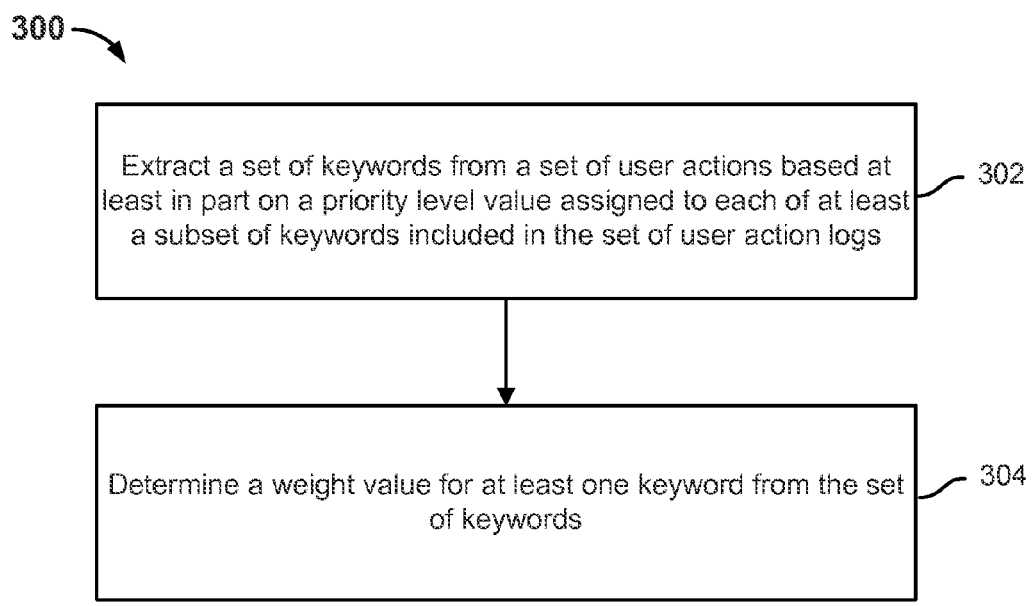
FIG. 3 is a flow diagram showing an embodiment of a process for extracting a set of keywords from a set of user action logs and also determining a weight value for at least one of the set of keywords.

FIG. 3 is a flow diagram showing an embodiment of a process for extracting a set of keywords from a set of user action logs and also determining a weight value for at least one of the set of keywords. In some embodiments, process 300 can be implemented at system 100.

In some embodiments, process 300 is implemented for extracting a first set of keywords from the set of retrieved user action logs that occurred prior to the predetermined time point (e.g., 202). In some embodiments, process 300 is also implemented for extracting a second set of keywords from the set of retrieved user action logs that occurred subsequent to the predetermined time point (e.g., 204). Put another way, process 300 can be used to implement 202 and/or 204 of process 200. However, in some embodiments, process 300 can be used to implement 202 of process 200 at a different periodic interval than for 204 of process 200.

While process 300 can be used to process all retrieved user action logs at once rather than be used to process each subset of all the retrieved user action logs (a first set of keywords from the set of retrieved user action logs that occurred prior to the predetermined time point and a second set of keywords from the set of retrieved user action logs that occurred subsequent to the predetermined time point) at a time such as in 202 and 204, the volume of all retrieved user action logs can be large and the processing thereof slow. Moreover, when all of the user's action logs are processed at once, the user's current interests might be overlooked. But by processing the first set of keywords from the set of retrieved user action logs that occurred prior to the predetermined time point and the second set of keywords from the set of retrieved user action logs that occurred subsequent to the predetermined time point separately (e.g., at different times), each set of data is smaller and therefore can be processed faster. The second set of keywords from the set of retrieved user action logs that occurred subsequent to the predetermined time point (204 of process 200) can even occur when a user accesses a web page while the first set of keywords from the set of retrieved user action logs that occurred prior to the predetermined time point (202 of process 200) has already been processed and the results thereof stored. By separately extracting the keywords in user action logs that occurred subsequent to the predetermined time point, consideration is given to the possibility that the user has changed user intentions within the most recent period, so that the keywords thus extracted thereof are a better reflection of the user's intentions as compared to the keywords extracted from the set of user action logs that occurred prior to the predetermined time point.

In some embodiments, each keyword of the set of keywords extracted from the set of user action logs can be stored with their respectively determined weight value as a two-dimensional vector in the format of <keyword, weight value>. The extracted keywords are used to represent the user's historical interests and the weight values of the respective keywords represent the interest level expressed by the user with respect to the keywords. For example, if the set of keywords extracted from the user action logs of a particular user is: {<wine, 14.1586>, <Sitir liquor, 9.29328>, <low grade clear spirits, 3.74181>, <Zhongliang Great Wall, 3.22576>, <Changyu, 3.1076>}, it can be concluded that the user has the strongest interest in wine, followed by Sitir liquor, low grade clear spirits, etc.

At 302, a set of keyword is extracted from a set of user action logs based at least in part on a priority level value assigned to each of at least a subset of keywords included in the set of user action logs. In some embodiments, a priority level value is assigned to each of at least a subset of all the keywords included in the set of user action logs. The keywords to which values were assigned are then ranked and a predetermined number of keywords associated with the highest priority levels are extracted as the set of keywords.

The following is an example technique of implementing 302:

Each of a product wordlist and a bid wordlist can be set up prior to implementing process 300. The product wordlist may be a database established based on all categories of product words (e.g., names of products) or a number of categories of product words. The bid wordlist may correspond to advertising keywords that ad providers can bid on.

First, central word extraction method is used to extract a predetermined number of central words from the set of action logs. In various embodiments, a "central word" is a word that is determined based on some metric/calculation to be more statistically significant than at least some other words in a set of words. Any known technique of extracting central words can be used. For example, the tf*idf weight and/or other statistical value of each keyword included in the set of action logs may be determined (using a known technique) and those with the highest tf*idf weights and/or statistical values will be considered as the central words. For example, if the keywords included in a set of action logs included "offer to supply wholesale Women Korean YES printing waist loose, casual dress 2011-T-9," then central words to extract from the set may include "Women," "Korean," "printing," "waist," "casual," and "dress." Each of the extracted central words is assigned a priority level of level one. In this example, there are three different priority levels, where priority level one<priority level two<priority level three.

Second, each extracted central word is matched against the product words included in the predetermined product wordlist. If a central word matches a product word, then the product word is extracted from the product wordlist and the priority level of the corresponding central word is increased to priority level two.

Third, each of the extracted product words is matched against the bid words included in the predetermined bid wordlist. If an extracted product word matched a word from the bid wordlist, then the bid word is extracted from the bid wordlist and the priority level of the corresponding central word is increased to priority level three.

Fourth, the set of central words is ranked by their respective priority levels assigned as described above. Then, a predetermined number of central words associated with the highest priority levels are extracted from the ranked central words. This set of extracted central words associated with the highest priority levels are deemed to be the set of keywords extracted from the set of user action logs.

At 304, a weight value is determined for at least one keyword from the set of keywords. In some embodiments, a weight value is determined for each of the keywords extracted from the set of user action logs.

The following is an example technique of implementing 304:

First, a preset point in time such as the current date is determined. Starting from this preset point such as the current date, the time preceding this time point is divided into a number of time segments according to a predetermined time interval. For example, the time interval may be set as X days, Y hours, one hour or half an hour. Each such time segment is assigned a sequence number.

Second, for each keyword in the set of keywords, the number of times that the keyword occurs within the set of action logs during each time segment is determined.

Third, the weight value is determined for each keyword in the set of keywords based on a predetermined weighting function, the sequence number of the time segment, and the number of times that the keyword occurs (e.g., across various types of user operations such as search operations and browse operations) within the set of user action logs during each time segment.

In some embodiments, the sequence numbers of the time segments are dependent on the selected weighting function. In some embodiments, if the weighting function is an increasing function, then the sequence number of each time segment may be determined as follows: according to the distance from the current date, the sequence number of the time segments that are farther removed (i.e., earlier in time to the current date) are smaller, and the sequence numbers of the time segments that are closer (i.e., closer in time to the current date) are greater.

In some other embodiments, if the weighting function is a decreasing function, then the sequence number of each time segment may be determined as illustrated in the following example:

In this example, the time interval is a day so each time segment is one day in length and the following formula may be used to compute a weight value ("Weight(keyword)") for each keyword in the set of keywords:

$$\text{Weight(keyword)} = \Sigma_{ti=1}^{k} f(ti)*n(ti) = f(t1)*n(t1) + f(t2)*n(t2) + \ldots + f(tk)*n(tk) \quad (1)$$

where ti represents the number of days removed from the current date, k represents the total number of days up until the current date (the total number of time segments), n(ti) represents the number of occurrences of the keyword on the date associated with ti (across all types of user operations), and $f(ti)$ represents a decreasing weighting function with respect to ti. In formula (1), the farther the date associated with ti is from the current date, the lower the determined value of $f(ti)*n(ti)$ is for the keyword. For example, the weighting function of $f(ti)$ may be selected as any appropriate function that decreases in value as ti grows larger, as long as it can reflect both the central word's representation of user interests as well as the assumption that a keyword that is associated with earlier user actions is of less interest to the user than a keyword that is associated with later user actions. For example, $e^{-a*ti}$ can be selected for weighting function $f(ti)$, in which the value of parameter a can be assigned an appropriate value.

The following is an example of using formula (1) to determine a weight value for a keyword in the set of keywords:

Assume that the time interval is one day and the preset point within the time period is the current date (Day 8). The time period of the set of user action logs comprises the last seven days in which there were 10 searches for keyword W. Out of the 100 web pages browsed, 27 web pages included keyword W with daily frequencies as shown in Table 1 below:

TABLE 1

| Occurrence day | Search frequency of keyword W | Total number of browsed web pages that include keyword W |
|---|---|---|
| Day 1 | 2 | 5 |
| Day 2 | 1 | 2 |
| Day 3 | 1 | 1 |
| Day 4 | 3 | 8 |
| Day 5 | 2 | 6 |
| Day 6 | 1 | 5 |
| Day 7 | 0 | 0 |

In this example, function $e^{-a*ti}$ can be selected for $f(t)$, in which the value of parameter a is selected as appropriate, and n(ti) is determined by adding together the search frequency of keyword W for the date associated with ti and the total number of browsed web pages that include the keyword W. As described above, because ti represents the number of days removed from the current date of Day 8, the date associated with ti=1 refers to Day 7, the date associated with ti=2 refers to Day 6, the date associated with ti=3 refers to Day 5, the date associated with ti=4 refers to Day 4, the date associated with ti=5 refers to Day 3, the date associated with ti=6 refers to Day 2, and the date associated with ti=7 refers to Day 1. Furthermore, because n(ti) represents the number of occurrences of the keyword on day i (across all types of user operations such as searching and browsing), n(ti) is the sum of the frequency of occurrences of the keywords associated one or more types of user operations. As applied to the present example, n(ti) would be the sum of the search frequency of keyword W and total number of browsed web pages that include keyword W for the date associated with ti.

To determine the weight value of keyword W prior to the preset point of time of Day 8, the values of Table 1 can be applied to formula (1) as follows:

Weight(keyword $W$)=$f(1)*0+f(2)*6+f(3)*8+f(4)*11+f(5)*2+f(6)*3+f(7)*7$

Figure 4:
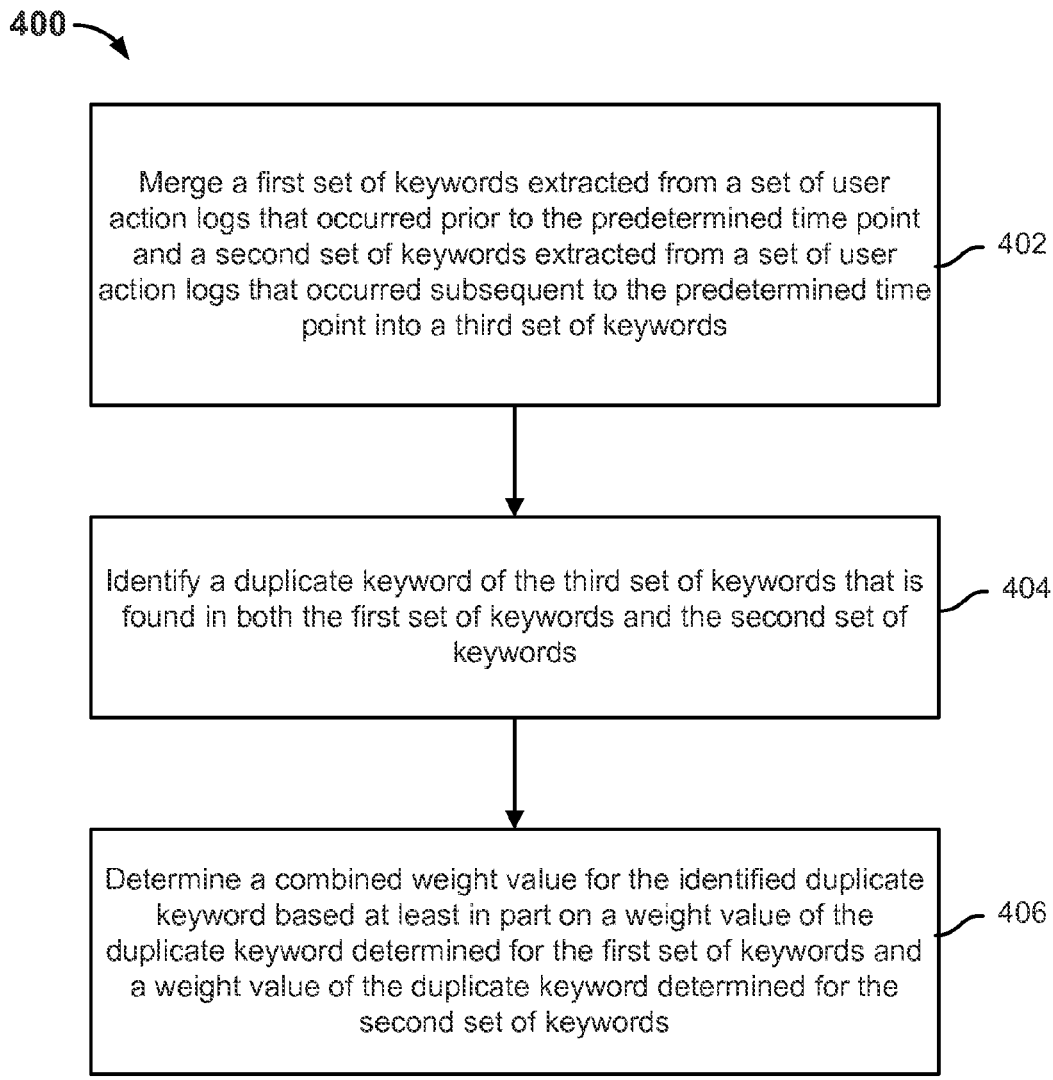
FIG. 4 is a flow diagram showing an embodiment of a process for merging a first set of keywords and a second set of keywords.

FIG. 4 is a flow diagram showing an embodiment of a process for merging a first set of keywords and a second set of keywords. In some embodiments, process 400 is implemented at system 100. In some embodiments, process 400 can be used to implement 206 of process 200.

At 402, a first set of keywords extracted from a set of user action logs that occurred prior to the predetermined time point and a second set of keywords extracted from a set of user action logs that occurred subsequent to the predetermined time point are merged into a third set of keywords. The third set can include both the first set and second set of keywords.

At 404, a duplicate keyword of the third set of keywords that is found in both the first set of keywords and the second set of keywords is identified. Duplicate keywords, which are keywords that appear in both the first set and the second set of keywords, are identified. For example, if the keyword "keyboard" appeared in the first set of keywords and also the second set of keywords, then "keyboard" would be identified as a duplicate keyword.

At 406, a combined weight value is determined for the identified duplicate keyword based at least in part on a weight value of the duplicate keyword determined for the first set of keywords and a weight value of the duplicate keyword determined for the second set of keywords (because a separate weight value was determined for the keyword while it was included in the first set and the second set). Continuing with the previous example, if the weight value determined for "keyboard" in the first set is W1 and the weight value determined for "keyboard" in the second set is W2, then the combined weight value for "keyboard" in the third set is W1+W2, for example. A combined weight value of a duplicate keyword can be associated with one instance of the keyword in the third set. So, there is only one copy of a duplicate keyword in the third set and it is associated with the combined weight value. Furthermore, the keywords in the third set of keywords that are not duplicates are associated with either their respective weight value determined in the first set of keywords or in the second set of keywords.

In some embodiments, a limit on the number of keywords that can be included in the third set of keywords can be preset such that if the number of keywords included in the third set exceeds this limit, then the keywords can be ranked by their respective weight values. And if the limit were X number of keywords, then only those X number of keywords with the greatest weight values are maintained in the third set while the others are excluded/discarded.

For example, assume that a keyword included in the user action logs is "apple." Because "apple" can be a kind of fruit as well as a brand of electronics, it is not immediately apparent what the user intends by searching for this keyword. However, if such keywords as "notebooks," "mp3," "notebook accessories," are obtained in the analysis of the user's historical action logs, the user's intentions can be represented by the third set of keywords that are determined for the user. For example, assume that {apple, notebooks, mp3, notebook accessories} comprises the third set of keywords determined for the user and so it can be inferred from the set of keywords that the user's intention is for the "Apple" brand of electronic products because the keywords besides "apple" are associated with electronic products. For example, if an ad to potentially present to a user is associated with the bid words of "apple notebooks," then it can be matched for the user versus another ad with the bid words of "apple fruit."

The third set of keywords and the weight value of each of the third set's respective keywords determined for a user may be considered to represent the user's interests. In some embodiments, the third set of keywords and the weight value of each of the third set's respective keywords that are considered to represent the user's intentions are stored for that user. In some embodiments, the third set of keywords determined for a user can be used to match various pieces of data to potentially recommend to that user.

Using the example of targeted online advertising, determining recommendation data can be applied as follows: in targeted online advertising, parties who wish to place ads on a website may purchase/bid on keywords relevant to their target market. Typically, when a query input by a user at the website matches a keyword on which the party has purchased/bid on, then the party's ad may be displayed for the user at the website. However, by applying the recommendation data determination process as described above, for each user that has previously visited a website, a set of keywords (the "third set of keywords") can be determined and stored for that user.

Then, when the user subsequently visits the website, an ad that is associated with at least one keyword in the set of keywords associated with the user is displayed for the user. This way, the ads displayed are targeted for the users who are currently visiting the website, rather than the same ads being displayed for every user regardless of each user's respective interests. For example, for a particular ad spot at a website, when advertiser A purchases this advertising space, it can specify that the target users of its ads are users who are interested in "sports," while another advertiser B can purchase the same ad spot and can specify that the target users of its ads are users who are interested in "electronics." As such, when user Alice who is interested in "sports" (as indicated by the third set of keywords associated with Alice) visits the website, ad placement at the ad spot can be performed by matching the keyword of "sports" that is determined for Alice to those keywords purchased by advertiser A and those purchased by advertiser B. Because the keyword of "sports" determined for Alice matches the keyword of "sports" purchased by advertiser A for the ad spot, then an ad associated with advertiser A and the keyword "sports" will be displayed. Sometimes, when multiple advertisers need to purchase/bid on the same keyword, an auction plays out based on the various bids submitted by the advertisers, and the ad associated with the advertiser with the winning bid will be displayed for users for whom the keyword was determined as being representative of that user's interests. For example, the keywords determined for users can be included in a bid wordlist and advertisers can bid on one or more of the keywords in the bid wordlist to target users in their relevant market.

Figure 5:
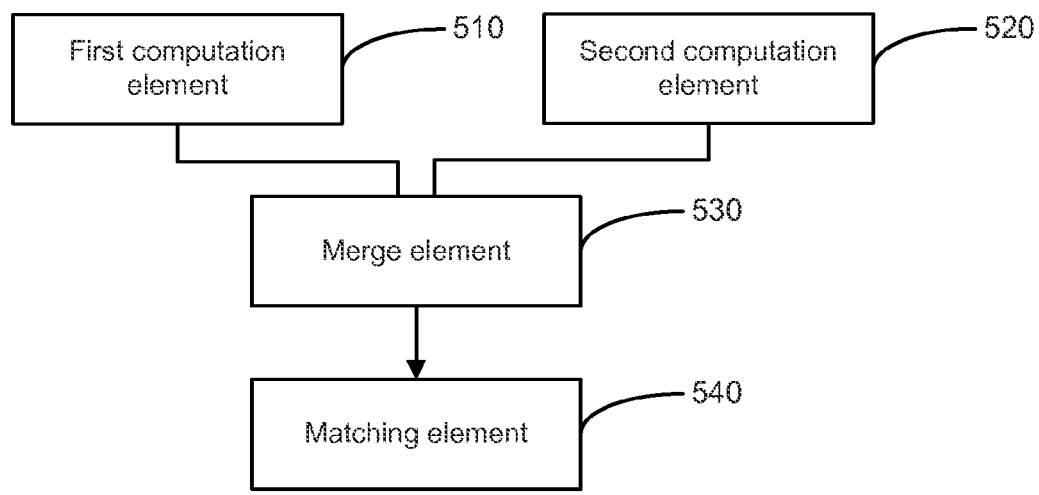
FIG. 5 is a diagram showing an embodiment of a system for determining recommendation data.

FIG. 5 is a diagram showing an embodiment of a system for determining recommendation data.

The elements and sub-elements can be implemented as software components executing on one or more processors, as hardware such as programmable logic devices and/or Application Specific Integrated Circuits designed to perform certain functions, or a combination thereof. In some embodiments, the elements and sub-elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The elements and sub-elements may be implemented on a single device or distributed across multiple devices.

System 500 includes first computation element 510, second computation element 520, merge element 530, and matching element 540. First computation element 510 is configured to retrieve the user's action logs that occurred prior to a predetermined time point, extract a first set of keywords included in the action logs, and determine a weight value for at least one of the keywords of the first set of keywords.

Second computation element 520 is configured to retrieve the user's action logs that occurred subsequent to a predetermined time point, extract a second set of keywords included in the action logs, and determine a weight value for at least one of the keywords of the second set of keywords.

Merge element 530 is configured to perform merge processing of the first set of keywords and the second set of keywords to obtain a third set of keywords and a weight value for at least one of the keywords in the third set of keywords.

Matching element 540 is configured to match the keywords included in the third set of keywords against the keywords associated with pieces of predetermined recommendation data to potentially recommend, determine one or more pieces of recommendation data that are to be recommended, and send the determined recommendation data to the client device that the user is currently using. In some embodiments, matching element 540 further includes:

A matching sub-element configured to match the keywords included in the third set of keywords against the keywords associated with pieces of predetermined recommendation data, and determine the pieces of recommendation data that are to be recommended.

A delivery sub-element configured to send the pieces of recommendation data determined to recommend and the website content requested by the user to the client device that the user is using.

Figure 6:
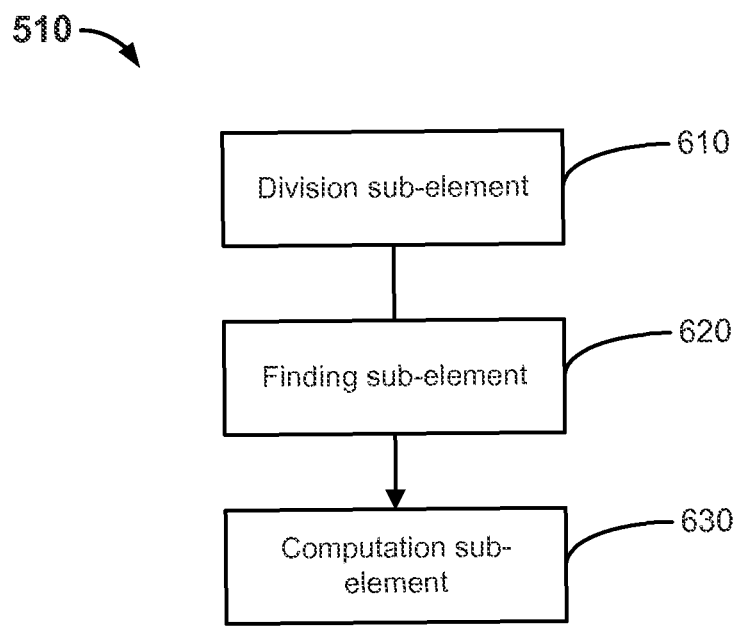
FIG. 6 is a diagram showing an embodiment of a first computation element.

FIG. 6 is a diagram showing an embodiment of a first computation element. In some embodiments, first computation element 510 may be implemented using the example of FIG. 6. First computation element 510 may include division sub-element 610, finding sub-element 620, and computation sub-element 630.

Division sub-element 610 is configured to divide the time preceding the preset time point such as, for example, a current day into a number of time segments based on a predetermined time interval (where each time segment would be the predetermined time interval long).

Finding sub-element 620 is configured, with respect to each keyword, to determine the number of occurrences of the keyword that are included in the action logs (associated with one or more types of user operations) during each time segment.

Computation sub-element 630 is configured to compute a weight for each keyword in the first set of keywords, based on a predetermined weighting function, the time interval by which the time segment is removed from the preset time point, and the number of occurrences of the keyword during each time segment.

Figure 7:
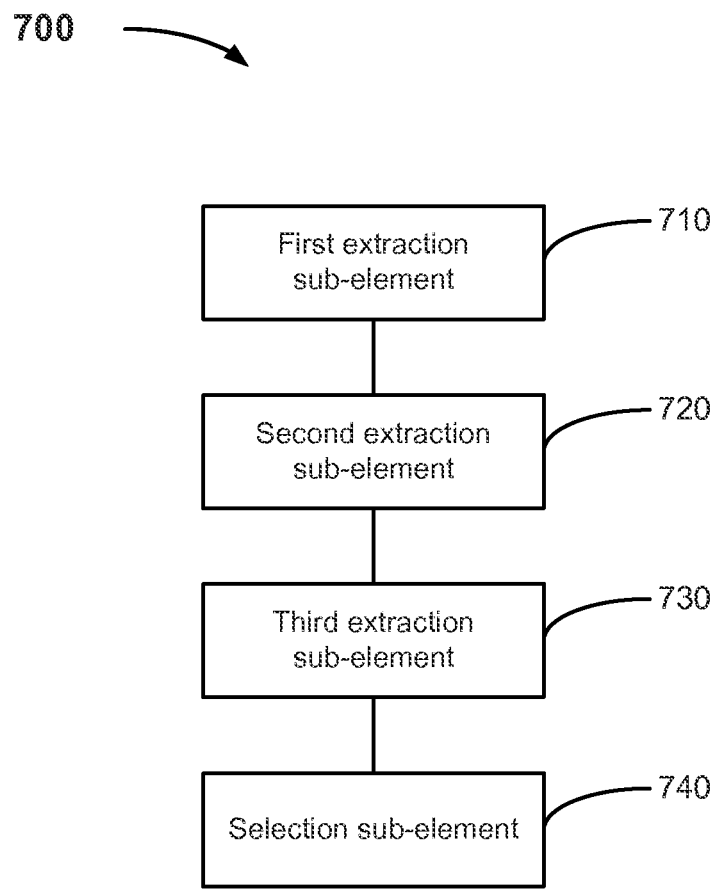
FIG. 7 is a diagram showing an embodiment of a first computation element or a second computation element.

FIG. 7 is a diagram showing an embodiment of a first computation element or a second computation element. In some embodiments, first computation element 510 or second computation 520 may be implemented using system 700. System 700 includes first extraction sub-element 710, second extraction sub-element 720, third extraction sub-element 730, and selection sub-element 740.

First extraction sub-element 710 is configured to extract a first predetermined number of central words from the set of action logs and to set the priority level of each central word to priority level one.

Second extraction sub-element 720 is configured to match each central word extracted against the product words included in a predetermined product wordlist and to extract the product words that match the central words and to increase the priority levels of the central words that match the extracted product words to priority level two.

Third extraction sub-element 730 is configured to match each extracted product word against the bid words included in a predetermined bid wordlist and to extract the bid words that match the product words (that matched the central words), and to increase the priority levels of the central words that match the extracted bid words to priority level three.

Selection sub-element 740 is configured to rank the central words according to their respective priority levels and to select a second predetermined number of keywords having the highest priority levels from the ranked central words to comprise the set of keywords.

Ordinary persons skilled in the art are able to understand that the process of realizing the techniques described in the aforesaid embodiments can be achieved using hardware associated with programmed commands, and that said programs can be stored on readable storage media; the corresponding steps contained in the method described above are executed during execution of said programs. The storage media may include such media as: ROM/RAM, floppy disk, CD, etc.

The description above is only a preferred means of implementing the present application; it should be pointed out that ordinary technical personnel in this field of technology, on the premise of non-departure from the principles of the present application, can also produce a number of improvements and embellishments, and that such improvements and embellishments should also be regarded as within the scope of protection of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for determining recommendation data, comprising:
   one or more processors configured to:
     extract a first set of keywords from a set of user action logs that occurred prior to a predetermined time point;
     extract a second set of keywords from a set of user action logs that occurred subsequent to the predetermined time point;
     merge at least a portion of the first set of keywords and at least a portion of the second set of keywords to obtain a third set of keywords;
     match at least one keyword in the third set of keywords with a database of data that can potentially be recommended to a user; and
     in the event that a piece of data in the database is determined to match at least one keyword from the third set of keywords, determine that the piece of data is to be recommended to the user; and
   one or more memories coupled to the one or more processors and configured to provide the one or more processors with instructions.

2. The system of claim 1, wherein the one or more processors are further configured to determine a weight value for a keyword in the first set of keywords, wherein the weight value is determined using: $\Sigma_{ti=1}^{k} f(ti)*n(ti)$,
   where ti represents a number of days removed from the predetermined time point, where k represents a total number of time segments, where n(ti) represents a number of occurrences of the keyword on a date associated with ti across one or more types of user operations, and $f(ti)$ represents a decreasing weighting function with respect to ti.

3. The system of claim 1, wherein a weight value for a keyword included in the first set of keywords is stored.

4. The system of claim 1, wherein each user action log includes at least a timestamp, a user operation, and an associated keyword.

5. The system of claim 1, wherein the piece of data comprises an online advertisement.

6. The system of claim 1, wherein to extract the first set of keywords further includes:
   extracting a predetermined number of central words from the set of action logs that occurred prior to the predetermined time point and assigning each central word to a priority level of level one;
   matching each central word against words in a product wordlist and assigning each central word that matches a word in the product wordlist a priority level of level two;
   matching each of those central words that matched a word in the product wordlist against bid words included in a bid wordlist and assigning each central word that matched a word in the product wordlist and also matches a word from the bid wordlist the priority level of level three;
   ranking the central words based at least in part on their respective priority levels; and
   determining that a predetermined number of central words associated with the highest priority level to be the first set of keywords.

7. The system of claim 1, wherein to extract the second set of keywords further includes:
   extracting a predetermined number of central words from the set of action logs that occurred subsequent to the predetermined time point and assigning each central word to a priority level of level one;
   matching each central word against words in a product wordlist and assigning each central word that matches a word in the product wordlist a priority level of level two;
   matching each of those central words that matched a word in the product wordlist against bid words included in a bid wordlist and assigning each central word that matched a word in the product wordlist and also matches a word from the bid wordlist the priority level of level three;
   ranking the central words based at least in part on their respective priority levels; and
   determining that a predetermined number of central words associated with the highest priority level to be the second set of keywords.

8. The system of claim 1, wherein the first set of keywords is extracted at every first time interval and the second set of keywords is extracted at every second time interval and wherein the first time interval is greater than the second time interval.

9. The system of claim 1, wherein to merge at least a portion of the first set of keywords and at least a portion of the second set of keywords includes:
   identifying a duplicate keyword that is found in both the first set of keywords and the second set of keywords; and
   determining a combined weight value for the identified duplicate keyword based at least in part on a weight value of the duplicate keyword determined for the first set of keywords and a weight value of the duplicate keyword determined for the second set of keywords.

10. The system of claim 9, wherein the one or more processors are further configured to maintain a limit on a number of keywords to be included in the third set of keywords by excluding one or more keywords associated with comparatively lower weight values from the third set in the event the limit is exceeded.

11. The system of claim 1, wherein to match the at least one keyword in the third set of keywords to the piece of data to potentially recommend includes determining whether a keyword associated with the piece of data matches any keyword from the third set of keywords.

12. The system of claim 1, wherein one or more processors are further configured to send the piece of data to be recommended to the user to a device associated with the user in response to a request for website content.

13. A method for determining recommendation data, comprising:
   extracting a first set of keywords from a set of user action logs that occurred prior to a predetermined time point;
   extracting a second set of keywords from a set of user action logs that occurred subsequent to the predetermined time point;

merging at least a portion of the first set of keywords and at least a portion of the second set of keywords to obtain a third set of keywords;

matching, using one or more processors, at least one keyword in the third set of keywords with a database of data that can potentially be recommended to a user; and in the event that a piece of data in the database is determined to match the at least one keyword from the third set of keywords, determining that the piece of data is to be recommended to the user.

14. The method of claim 13, wherein each user action log includes at least a timestamp, a user operation, and an associated keyword.

15. The method of claim 13, wherein the piece of data comprises an online advertisement.

16. The method of claim 13, wherein extracting the first set of keywords further includes:

extracting a predetermined number of central words from the set of action logs associated with timestamps prior to the predetermined time point and assigning each central word to a priority level of level one;

matching each central word against words in a product wordlist and assigning each central word that matches a word in the product wordlist a priority level of level two;

matching each of those central words that matched a word in the product wordlist against bid words included in a bid wordlist and assigning each central word that matched a word in the product wordlist and also matches a word from the bid wordlist the priority level of level three;

ranking the central words based at least in part on their respective priority levels; and determining that a predetermined number of central words associated with the highest priority level to be the first set of keywords.

17. The method of claim 13, wherein extracting the second set of keywords further includes:

extracting a predetermined number of central words from the set of action logs associated with timestamps subsequent to the predetermined time point and assigning each central word to a priority level of level one;

matching each central word against words in a product wordlist and assigning each central word that matches a word in the product wordlist a priority level of level two;

matching each of those central words that matched a word in the product wordlist against bid words included in a bid wordlist and assigning each central word that matched a word in the product wordlist and also matches a word from the bid wordlist the priority level of level three;

ranking the central words based at least in part on their respective priority levels; and determining that a predetermined number of central words associated with the highest priority level to be the second set of keywords.

18. The method of claim 13, wherein the first set of keywords is extracted at every first time interval and the second set of keywords is extracted at every second time interval and wherein the first time interval is greater than the second time interval.

19. The method of claim 13, wherein merging at least a portion of the first set of keywords and at least a portion of the second set of keywords includes:

identifying a duplicate keyword that is found in both the first set of keywords and the second set of keywords; and determining a combined weight value for the identified duplicate keyword based at least in part on a weight value of the duplicate keyword determined for the first set of keywords and a weight value of the duplicate keyword determined for the second set of keywords.

20. The method of claim 19, further comprising maintaining a limit on a number of keywords to be included in the third set of keywords by excluding one or more keywords associated with comparatively lower weight values from the third set in the event the limit is exceeded.

21. The method of claim 13, wherein matching the at least one keyword in the third set of keywords to the piece of data to potentially recommend includes determining whether a keyword associated with the piece of data matches any keyword from the third set of keywords.

22. The method of claim 13, further comprising sending the piece of data to be recommended to the user to a device associated with the user in response to a request for website content.

23. A computer program product for determining recommendation data, the computer program product being embodied in a non-transitory computer readable medium and comprising computer instructions for:

extracting a first set of keywords from a set of user action logs that occurred prior to a predetermined time point;

extracting a second set of keywords from a set of user action logs that occurred subsequent to the predetermined time point;

merging at least a portion of the first set of keywords and at least a portion of the second set of keywords to obtain a third set of keywords;

matching at least one keyword in the third set of keywords with a database of data that can potentially be recommended to a user; and in the event that a piece of data in the database is determined to match the at least one keyword from the third set of keywords, determining that the piece of data is to be recommended to the user.

* * * * *